Patented Nov. 21, 1933

1,936,364

UNITED STATES PATENT OFFICE 1,936,364

CITRATE SOLUTIONS

Richard Pasternack and Clinton P. Ammerman, Brooklyn, N. Y., assignors to Charles Pfizer & Company, Brooklyn, N. Y., a corporation of New Jersey No Drawing. Application August 22, 1930
Serial No. 477,186

14 Claims. (Cl. 167—55)

This invention relates to citrate solutions and more particularly to solutions of magnesium citrate and magnesium citrate compositions.

The formula of the Pharmacopoeia of the United States for magnesium citrate solution calls for 35 gms. of citric acid, 15 gms. of magnesium carbonate (containing 39.2% MgO) and 2.5 gms. of potassium bicarbonate or 2.1 gms. of sodium bicarbonate, per 350 ccs. of solution. In this formula the proportion of magnesium oxide to citric acid is such that it allows the formation of di-basic magnesium citrate, $MgHC_6H_5O_7$, in stable solution, 10% of the total citric acid introduced being left in excess as free citric acid. Any material reduction in the excess of citric acid from that given in the formula will result in a solution which gradually deposits insoluble tri-basic magnesium citrate, $Mg_3(C_6H_5O_7)_2 \cdot 9H_2O$. That the free citric acid in the U. S. P. formula cannot be materially reduced without risk of precipitation was determined as follows: 29.8 gms. of $Mg_3(C_6H_5O_7)_2 \cdot 9H_2O$, the amount equivalent to 15 gms. of magnesium carbonate (containing 39.2% MgO), was boiled in 310 cc. of water, the amount of water necessary to give 350 cc. of solution as per the U. S. P. formula. The boiling was continued and citric acid was added until complete solution was effected. 12.5 to 13 gms. of citric acid were required. As 29.8 gms. of $Mg_3(C_6H_5O_7)_2 \cdot 9H_2O$ are equivalent to 20.4 gms. of citric acid and 1.75 gms. of citric acid are necessary to neutralize the 2.5 gms. of potassium bicarbonate used in the U. S. P. formula, the total amount of citric acid required to obtain a stable solution is 34.65–35.15 gms., approximately the amount called for in the U. S. P. formula.

The high acidity of the magnesium citrate solution due to the free citric acid gives the product an excessively sour taste.

An object of the present invention is to provide a palatable magnesium citrate solution of materially lower acidity than heretofore obtained.

A further object is the provision of a stable magnesium citrate solution of greater concentration than heretofore known.

A still further object of the present invention is to provide a dry stable mixture comprising magnesium carbonate or oxide, citric acid, and a tribasic magnesium citrate solvent compound, which may be converted into an improved magnesium citrate solution by the addition of water and the remaining commonly employed ingredients of magnesium citrate solutions.

Another object of the present invention is to provide a dry stable product resulting from the reaction of magnesium carbonate or oxide with citric acid and a tribasic magnesium citrate solvent compound.

We have discovered that gluconic acid has the property of preventing precipitation of tribasic magnesium citrate, and can be substituted for the excess free citric acid heretofore used in U. S. P. magnesium citrate solutions. Thereby a stable, less acid, and more palatable solution can be produced and also one of higher concentration. The magnesium carbonate or oxide can now be mixed dry with the dry citric acid and gluconic acid lactone, said lactone being an equivalent of gluconic acid for this purpose but better adapted for use in a dry mixture as it is a stable, solid compound, and kept ready for making the solution when required.

As shown above, it required about 13 gms. of citric acid to dissolve 29.8 gms. of $$Mg_3(C_6H_5O_7)_2 \cdot 9H_2O$$

in 310 cc. of water on boiling. The same quantity of $Mg_3(C_6H_5O_7)_2 \cdot 9H_2O$ is also dissolved in 310 cc. of water upon the addition of 13 gms. of gluconic acid, but 13 gms. of gluconic acid are equivalent in acid value to only 4.64 gms. of citric acid. Hence the solution produced by 13 gms. of gluconic acid has only about one third of the titrable acidity of the U. S. P. product using only citric acid. The magnesium citrate solution produced by using gluconic acid to replace some or all of the free citric acid has only a mildly acid taste due to its much lower acidity than the U. S. P. product but the therapeutic value of the product remains unchanged, as it is in no way influenced by the acidity of the solution.

To illustrate the invention, the following example of a formula for a citrate of magnesia solution of U. S. P. strength is given:

| | |
|---|---|
| Magnesium carbonate, (39.2% MgO) | 15.0 gms. |
| Citric acid | 23.0 gms. |
| Gluconic acid, (100% basis) | 13.0 gms. |
| Syrup | 60.0 ccs. |
| Or sugar | 51.0 gms. |
| Talc, purified | 5.0 gms. |
| Oil of lemon | 0.1 ccs. |
| Sodium bicarbonate, (in tablet form) | 2.1 gms. |
| Water, distilled, a quantity sufficient to make | 350.0 ccs. sol. |

The citric and gluconic acids are dissolved in 150 cc. of hot distilled water. 15 gms. magnesium carbonate or about 6 gms. of magnesium oxide mixed with 100 cc. of distilled water are added to the acid solution which is stirred until the magnesium compound is dissolved. The syrup or sugar is then introduced and the solution is heated to its boiling point whereupon the oil of lemon, which has been triturated with the talc, is immediately added and the liquid is filtered, while hot, into a 350 cc. capacity bottle. Distilled water is added to fill the bottle and the sodium bicarbonate tablet is dropped in and the bottle immediately stoppered. The bottle is then immersed for 30 minutes in a water bath at 90° C. to sterilize the solution.

A stable solution of magnesia in citric acid and gluconic acid, containing more than 2 gms. of MgO per 100 cc. of solution can be prepared in this manner whereas a stable solution of magnesia in citric acid alone, containing more than 1.8 gms. of MgO per 100 cc., could not heretofore be prepared, and the stability of a solution containing even that amount of MgO was not very great.

The above formula is merely illustrative and the ingredients and proportions of ingredients may be varied considerably. The amount of gluconic acid may be increased and the amount of sugar may be decreased to suit the taste without affecting the stability of the solution. Also the amount of water may be reduced by more than one half to give a greatly more concentrated solution. This is a material advantage over the U. S. P. product as it allows a much more concentrated stable magnesium citrate solution to be marketed, thus effecting a considerable saving in the cost of containers and shipping, and allowing a substantial reduction in the volume of an effective dose of the solution.

In place of gluconic acid, any of the known gluconic acid lactones such as the beta, gamma, or delta lactone, may be used and the term "gluconic acid lactone", as used herein, is meant to include the known gluconic acid lactones. As 0.91 gms. of gluconic acid lactone are equivalent to 1 gm. of gluconic acid (100 % basis), the amount of lactone used in place of gluconic acid is diminished accordingly.

Gluconic acid lactone is a stable solid and it may be mixed with magnesium carbonate or oxide and citric acid and, if desired, with the other solid ingredients of magnesium citrate solutions, and then be stored without deterioration. This dry stable mixture is advantageous as it can be shipped to druggists or the like who can store it until needed and then mix it with water and the other necessary ingredients, and bottle the solution. The dry mixture may also be sold to the consumer who can make up the solution therefrom. For example, a dry composition comprising magnesium carbonate (39.2% MgO), anhydrous citric acid, and gluconic acid lactone in the proportion by weight of 15:20:12 can be stored and shipped without deterioration and a citrate of magnesia solution of U. S. P. strength can readily be made by adding the required amount of water, sweetening and flavouring, and bicarbonate. Shipping and storage of the dry mixture is advantageous as the water which gives the solution most of its bulk and weight, need not be added until shortly before the solution is to be delivered to the consumer or the dry mixture can be sold to the consumer who may make up the solution without difficulty.

A dry mixture comprising magnesium carbonate or oxide, gluconic acid lactone, and a free flowing granular substantially anhydrous citric acid obtained by exposing comminuted citric acid containing its water of crystallization in shallow layers and applying dry air at a temperature of between 35° C. and 50° C. until the acid becomes granular and free flowing is particularly advantageous. Due to the free flowing, granular characteristic of the citric acid, a uniform mixture of the ingredients is easier to obtain and also the handling and measuring of the dry mixture is facilitated.

Another dry mixture of advantageous properties is made as follows:

220 parts by weight citric acid (with 1 mol $H_2O$), 59 parts by weight magnesium oxide (on 100% basis), 130 parts by weight gluconic acid (on 100% basis), are dissolved in 800 parts of water. The resulting solution is filtered and evaporated to dryness, preferably in vacuo. A dry amorphous product is thus obtained, which may be ground into a fine white powder. We have not determined the exact chemical constitution of this new composition but it contains the magnesia combined with both citric and gluconic acid, that is, it is, in effect, a magnesium-glucono-citrate.

This new product is stable under ordinary conditions of storage. It is very soluble in water, so that even solutions of a syrupy consistency can be prepared. About 40 gms. of the dry product mixed with a suitable amount of sweetening, flavoring and bicarbonate is the equivalent in strength of one bottle of U. S. P. citrate of magnesia solution. This dry mixture can be marketed directly to the consumer, who may dissolve it in any desired quantity of water.

The invention claimed is:

1. Product comprising a stable aqueous solution of magnesium citrate and gluconic acid, containing substantially no excess of citric acid.

2. A new product comprising a stable solution of magnesia in citric and gluconic acids, containing more than 1.8 gms. of MgO per 100 cc. of solution.

3. A dry product comprising a member selected from the group consisting of magnesium carbonate and magnesium oxide, citric acid, and gluconic acid lactone.

4. A dry product comprising about 15 parts by weight of magnesium carbonate, 23 parts by weight of citric acid, and 12 parts by weight of gluconic acid lactone.

5. A dry product comprising about 6 parts by weight of magnesium oxide, 23 parts by weight of citric acid, and 12 parts by weight of gluconic acid lactone.

6. Product comprising a stable aqueous solution of magnesia and citric and gluconic acids in the ratio of 6 parts of magnesia to at least 20 parts of anhydrous citric acid and at least 12 parts of gluconic acid.

7. A new product comprising a stable aqueous solution containing the reaction product, per 350 cc. of solution, of about 6.0 gms. of magnesia, 23 gms. of citric acid, 13.0 gms. of gluconic acid, sugar, flavoring, and an alkali metal bicarbonate equivalent to 1.75 gms. citric acid, said product having a therapeutic value equivalent to the U. S. P. product.

8. A stabilized solution containing the reaction product of about 6 gms. of magnesia, 23.0 gms. of citric acid, and 13.0 gms. of gluconic acid in sufficient water to give at least 175 cc. of solution.

9. A dry product comprising magnesia, granular substantially anhydrous citric acid, and gluconic acid lactone.

10. A dry product comprising about 6 parts by weight of magnesia, 20 parts by weight of granular substantially anhydrous citric acid, and 12 parts by weight of gluconic acid lactone.

11. A composition of matter comprising magnesium citrate and gluconic acid.

12. A composition of matter comprising magnesium citrate and gluconic acid in the approximate proportion of 30 gms. of magnesium citrate to upwards of 13 gms. of gluconic acid.

13. A composition of matter, comprising a dry product from the reaction in aqueous solution of magnesia and citric and gluconic acids in the ratio to 6 parts of magnesia of at least 20 parts of anhydrous citric acid and at least 12 parts of gluconic acid.

14. A dry product comprising magnesia, citric and gluconic acids in the ratio, to 6 parts of magnesia, of at least 20 parts of anhydrous citric acid and at least 12 parts of gluconic acid.

RICHARD PASTERNACK.
CLINTON P. AMMERMAN.